Patented Oct. 15, 1935

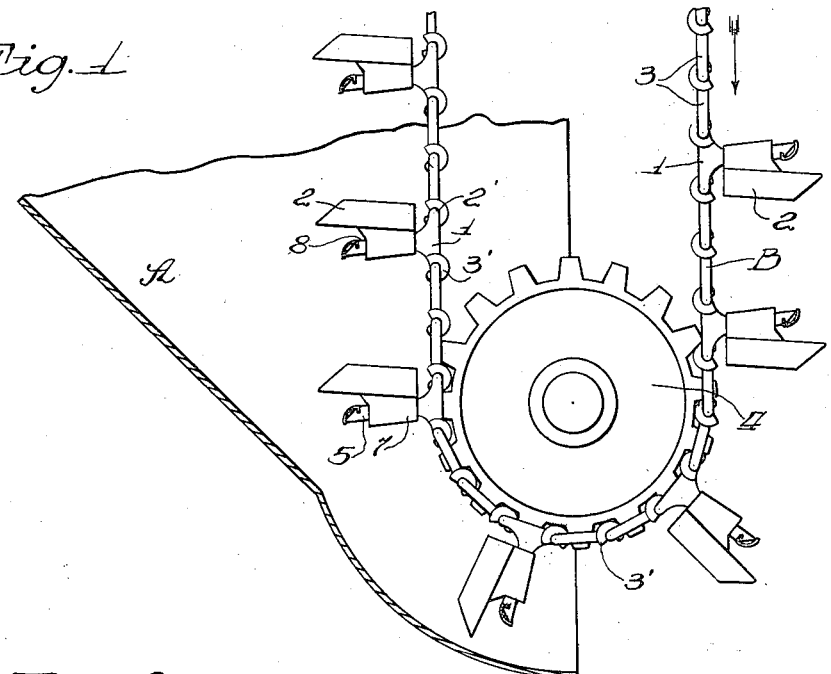
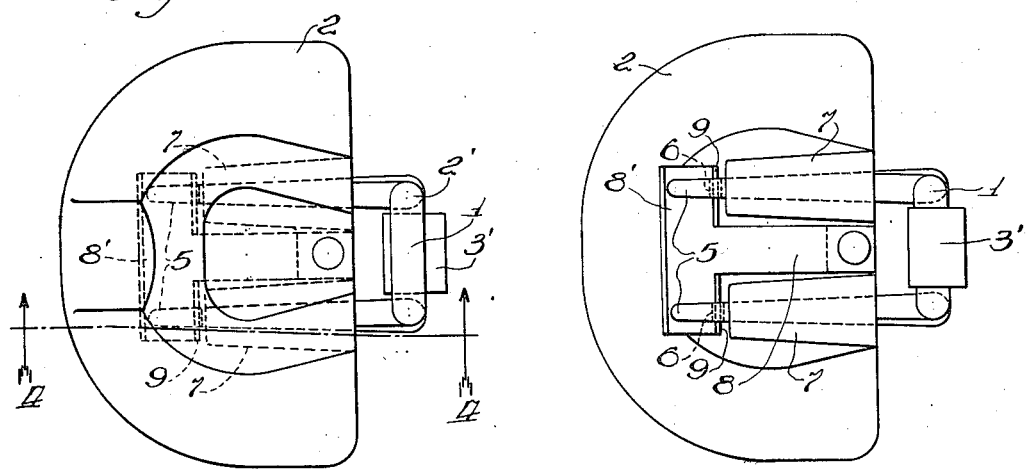
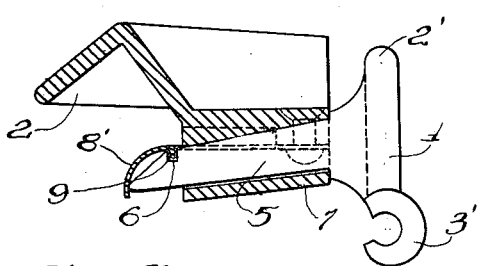

2,017,738

UNITED STATES PATENT OFFICE 2,017,738

DETACHABLE CUP FOR PLANTERS

Frank Thompson, Marcq en Baroeul, France, assignor to International Harvester Company, a corporation of New Jersey Application July 5, 1934, Serial No. 733,798
In Germany November 18, 1933

6 Claims. (Cl. 198—151)

The present invention relates to machines for planting potatoes and the like type of seed, wherein the potatoes or other seeds are fed from a hopper containing the supply of seed to a delivery tube by means of seed cups or receptacles mounted on an endless conveyer, band or chain. More specifically it relates to an improved mounting of the cup or receptacle on the said conveyer, band or chain.

When planting potatoes and other seeds of like nature, it is found desirable to use graded seed; that is, seeds which are all approximately the same size, because the planting machine works more efficiently and gives a more regular planting with such seed than with seed of irregular size.

In machines of the kind referred to above, where cups or like receptacles carried on chains or belts are used to convey the seed from the hopper to the delivery tube, it is especially desirable to use such graded seed because the seed receptacles are constructed to contain seeds of a certain size, and, if the seed is much smaller than the receptacles, there is danger of it picking up two or more seeds with consequent double planting; or, again, if the seeds are too large for the receptacle they will not set well therein and will fall back into the hopper before reaching the delivery tube.

It is customary, therefore, to use graded seed, as described, and to employ on the planting machine seed receptacles of a size to just contain a single seed. To this end, it has been proposed in connection with such planting machines to provide a plurality of sets of seed cups of different sizes, so that a particular set may be selected for use according to the size of the seed to be planted at any particular time. Since, however, the seed cups have hitherto been constructed integrally with the conveyer, chain or band, or have been fixed thereto by means of rivets or screws, the change of one set of cups for another set of a different size has involved changing the whole conveyer, or each individual seed cup has had to be unbolted from the conveyer and the new one bolted thereon, which is a long and troublesome procedure.

The object of the present invention, therefore, is to facilitate the changing of one set of seed cups for another by providing a construction and mounting wherein the seed cups are readily detachable from the conveyer chain or band and are replaceable thereon without the necessity of manipulating bolts or the like and without involving the change of the conveyer, chain or band.

To this end according to the invention the parts of the conveyer, chain or band at which seed cups are to be fitted are provided with a projecting pin or pins for supporting the seed cups, and the cups are provided with an aperture or apertures adapted to receive the pin or pins, and the receptacle is further provided with a latch spring arranged to catch in a notch provided in the said pin or pins on the conveyer to hold the receptacles firmly thereon. In this manner, when it is desired to remove a seed cup from the conveyer, the latch spring is pressed until it is disconnected from the notch in the pin or pins, and the cup may then be slid off the pins; to replace the cup, it is pushed over the pin or pins until the latch spring catches in the notch.

In order to make the invention clear, it will now be described with reference to the attached drawings which show a preferred form of the invention, wherein:

Figure 1 is a cross sectional view through a seed receptacle or cup, showing a chain conveyer;

Figure 2 is a top plan view of one of the conveyer links with a cup or receptacle carried thereby;

Figure 3 is a plan view from the bottom of the link shown in Figure 2; and,

Figure 4 is a side elevation of the same link shown in Figure 2, with the receptacle in vertical section.

In the form of the invention shown in the drawing, the conveyer carrying the seed cups is an endless chain having links 1 with the seed cups 2 mounted thereon, and having further links 3 not provided with such seed cups. A conveyer chain of this general construction is conventional in the potato planting art, as shown in the United States Patent No. 1,510,021. For that reason, only a portion of the seed hopper A and the lower end of the conveyer chain B, and the lower sprocket 4, which supports the chain, have been shown in the drawing. The seed receptacles have the known form of a shallow dished-shape cup.

The link 1 terminates at one end in a roll portion 2' and at the other end in a hook portion 3', the roll 3 of one link being adapted to fit loosely in the hook portion 3' of the adjacent link, so forming a continuous jointed chain, as well known in this type of machine.

According to the invention the flat portion of the link 1 between the roll 2' and the hook 3' is provided with a pair of tapered pins 5 projecting at substantially right angles therefrom. These pins are each formed at the upper side near its outer end with a horizontal notch 6.

The seed cup or receptacle 2 is formed at its lower side or base with two horizontal protuberances or bosses 7 in which tapered holes are formed, these holes being of a suitable size to fit over the pins 5 on the link 1. The said pins 5 are of such a length that their notched ends project beyond the protuberances 7, as clearly shown in Figures 3 and 4.

Riveted or otherwise suitably fixed to the bottom of the cup or receptacle 2 between the protuberances 7 is a spring 8, which is of T shape in plan, as shown in Figure 3, and of which the arms 8' extend at each side beyond the pins 5, and being bent around the ends of said pins as shown in Figure 4. The lower sides of the arms 8' adjacent to the pins 5 are provided with projecting edges 9 disposed at right angles to the plane of the spring and adapted to enter the notches 6 in the pins 5, as best seen in Figure 4.

When, therefore, it is desired to attach the seed cups 2 to the chain link 1, the pins 5 are inserted in the horizontal tapered holes in the protuberances 7, and the cup is then pushed towards the link until the edge 9 of the T spring enters the notches 6 of the pins. The cup is then held firmly on the chain. When, however, it is desired to detach the seed cups 2, the T spring 8 is pushed toward the lip of the cup by pressing on the curved portion projecting beyond the pins until the edge 9 is clear of the notches 6, whereupon the cup can be slid off the pins.

As will be understood the invention is shown with respect to a link forming part of a conveyer of chain form, but a similar construction could be employed in cases where the conveyer comprises any flexible member.

It is to be understood that applicant claims as his invention any form of removable cup for conveyers falling within the scope of the appended claims.

What is claimed is:

1. In a conveyer mounted and driven to pass vertically through a hopper, and in combination, a pair of transversely aligned supports extending substantially at right angles from said conveyer, said supports being formed with notches therein, a receptacle removably mounted on said supports, and a latch means for securing the receptacle to the supports by engagement with the notches therein.

2. In a conveyer mounted and driven to pass vertically through a hopper, and in combination, a support secured to the conveyer and extending at substantially right angles thereto, a seed receptacle removably mounted on said support, and manually releasable latch means for securing said receptacle to said support.

3. In a conveyer mounted and driven to pass vertically through a hopper, and in combination, a pair of transversely aligned supports secured to the conveyer and extending substantially at right angles thereto, a seed receptacle provided with a pair of spaced downwardly extending bosses apertured to fit said supports, and means for removably securing the receptacle to said supports.

4. In a conveyer mounted and driven to pass vertically through a hopper, and in combination, a pair of transversely aligned supports secured to the conveyer and extending substantially at right angles thereto, a seed receptacle provided with a pair of spaced downwardly extending bosses apertured to fit said supports, and a manually releasable latch means for securing said receptacle to said supports.

5. In a conveyer mounted and driven to pass vertically through a hopper, and in combination, a pair of transversely aligned supports secured to the conveyer and extending substantially at right angles thereto, a seed receptacle provided with a pair of spaced downwardly extending bosses apertured to fit said supports, and a T-shaped spring latch means secured to the bottom of said receptacle, said supports being formed with notches engageable by said latch spring for removably securing the receptacle on the supports.

6. In a linked conveyer for potato planters, and in combination, supports secured to certain of the links and extending substantially at right angles thereto, seed receptacles removably mounted on said supports, and spring latch means carried by the receptacles and engageable with supports for removably securing the receptacles to the supports.

FRANK THOMPSON.